(12) United States Patent
Cooper

(10) Patent No.: US 9,645,374 B2
(45) Date of Patent: May 9, 2017

(54) LIGHT-SCANNING SYSTEMS

(75) Inventor: Jeremy R. Cooper, Issaquah, WA (US)

(73) Assignee: GE Healthcare Bio-Sciences AB, Uppsala (SE)

(*) Notice: Subject to any disclaimer, the term of this patent is extended or adjusted under 35 U.S.C. 154(b) by 291 days.

(21) Appl. No.: 13/979,098

(22) PCT Filed: Dec. 29, 2011

(86) PCT No.: PCT/SE2011/051602
§ 371 (c)(1),
(2), (4) Date: Jul. 10, 2013

(87) PCT Pub. No.: WO2012/099521
PCT Pub. Date: Jul. 26, 2012

(65) Prior Publication Data
US 2013/0286456 A1    Oct. 31, 2013

Related U.S. Application Data

(60) Provisional application No. 61/434,557, filed on Jan. 20, 2011.

(51) Int. Cl.
*G02B 21/00* (2006.01)
*G02B 26/10* (2006.01)

(52) U.S. Cl.
CPC ....... *G02B 21/0048* (2013.01); *G02B 26/105* (2013.01); *G02B 21/0076* (2013.01)

(58) Field of Classification Search
CPC   G02B 21/002–21/0048; G02B 26/10–26/129; G02B 17/004
See application file for complete search history.

(56) References Cited

U.S. PATENT DOCUMENTS

| 4,054,360 | A | 10/1977 | Oosaka et al. |
| 4,682,842 | A | 7/1987 | Brueggemann |
| 4,960,312 | A | 10/1990 | Razzaghi |

(Continued)

FOREIGN PATENT DOCUMENTS

| DE | 10209322 | 9/2003 |
| DE | 10 2006 028530 | 5/2007 |

(Continued)

OTHER PUBLICATIONS

EP Search Report Dated May 27, 2014 Issued on Corresponding EP Application No. 11856471.5.

(Continued)

*Primary Examiner* — Joseph P Martinez
*Assistant Examiner* — Cara Rakowski
(74) *Attorney, Agent, or Firm* — Eversheds Sutherland (US) LLP

(57) ABSTRACT

Various light-scanning systems that can be used to perform rapid point-by-point illumination of a focal plane within a specimen are disclosed. The light-scanning systems can be incorporated in confocal microscopy instruments to create an excitation beam pivot axis that lies within an aperture at the back plate of an objective lens. The light-scanning systems receive a beam of excitation light from a light source and direct the excitation beam to pass through the pivot point in the aperture of the back plate of the objective lens while continuously scanning the focused excitation beam across a focal plane.

7 Claims, 6 Drawing Sheets

(56) References Cited

U.S. PATENT DOCUMENTS

| | | | |
|---|---|---|---|
| 6,128,077 | A | 10/2000 | Jovin et al. |
| 6,211,988 | B1 | 4/2001 | Engelhardt et al. |
| 6,407,856 | B1 | 6/2002 | Kask et al. |
| 7,834,158 | B2 | 11/2010 | Hober |
| 7,978,389 | B2 | 7/2011 | Ishibashi |
| 8,649,089 | B2 | 2/2014 | Wang et al. |
| 2002/0018310 | A1* | 2/2002 | Hung .................. 359/861 |
| 2002/0024007 | A1 | 2/2002 | Engelhardt et al. |
| 2002/0163704 | A1 | 11/2002 | Hayashi et al. |
| 2003/0035208 | A1 | 2/2003 | Engelhardt |
| 2004/0125428 | A1 | 7/2004 | Kobayashi |
| 2005/0146784 | A1 | 7/2005 | Vogt |
| 2006/0072191 | A1 | 4/2006 | Akiyama et al. |
| 2007/0146869 | A1 | 6/2007 | Lauer |
| 2007/0153373 | A1 | 7/2007 | Uhl |
| 2007/0268574 | A1 | 11/2007 | Sasaki |
| 2010/0214404 | A1 | 8/2010 | Chen et al. |
| 2010/0284051 | A1 | 11/2010 | Ishibashi |
| 2011/0188105 | A1 | 8/2011 | Wang et al. |

FOREIGN PATENT DOCUMENTS

| | | |
|---|---|---|
| GB | 2 053 505 A | 2/1981 |
| JP | 49-118436 A | 11/1974 |
| JP | 2002-258203 A | 9/2002 |
| WO | WO 03/046613 | 6/2003 |

OTHER PUBLICATIONS

Christ, T., et al., Chemical Physics Letters, vol. 372, No. 5-6 (2003) 878-885.

Rembe, C., et al., Review of Scientific Instruments, vol. 77, No. 8 (2006) 083702-1-083702-11.

Japanese Office Action for JP Application No. 2013-550444 mailed Jan. 26, 2016 (5 pages).

Japanese Office Action for JP Application No. 2013-550444 mailed Jun. 21, 2016 (2 pages).

Japanese Office Action for JP Application No. 2016-087290 mailed Mar. 14, 2017 (3 pages, including English translation).

* cited by examiner

LIGHT-SCANNING SYSTEMS

CROSS-REFERENCE TO A RELATED APPLICATION

This application is a filing under 35 U.S.C. 371 of international application number PCT/SE2011/051602, filed Dec. 29, 2011, published on Jul. 26, 2012 as WO 2012/099521, which claims the benefit of Provisional Application No. 61/434,557; filed Jan. 20, 2011.

TECHNICAL FIELD

This disclosure relates to fluorescence microscopy and, in particular, to scanning systems that can be used in microscopy instruments to illuminate and scan a focal plane of a specimen.

BACKGROUND

Laser scanning confocal microscopy has become a significant advance in optical microscopy, primarily because the technique enables visualization deep within living and fixed cells and tissues and affords the ability to collect sharply defined optical sections from which three-dimensional renderings of a specimen can be created. Confocal microscopy offers several advantages over conventional widefield optical microscopy, including control over depth of field, elimination or reduction of background information away from the focal plane, and the ability to collect serial optical sections from thick specimens. Confocal imaging typically relies on sequential collection of light from spatially filtered individual specimen points, followed by electronic-signal processing and ultimately, the visual display as corresponding image points. Typical confocal microscopes use a focused beam or line of excitation light to illuminate a point or line within the specimen. Scanning the focused excitation beam across the specimen focal plane can be accomplished by mechanically translating the microscope stage with respect to the fixed position of the focused excitation beam. However, mechanically translating the stage is a time consuming process. Alternatively, the excitation beam can be scanned across the focal plane by reflecting the beam off of a rotatable minor. However, rotating the minor creates a pivot axis that often results in a portion of the excitation beam being clipped by a plate located at the back of the objective, thereby reducing the irradiance of the excitation beam that reaches the focal plane.

Engineers and microscope designers have attempted to correct these problems by designing various lens-based systems to control the path of the excitation beam. However, lenses introduce unacceptable aberrations into the system for large scan angles as well as a substantially increased path length, and lenses also require additional alignment degrees of freedom which can add to system complexity. For the above described reasons, engineers, scientists, and microscope manufacturers continue to seek faster systems and methods for scanning confocal illumination of a focal plane.

SUMMARY

Various light-scanning systems that can be used to perform rapid line-by-line illumination of a focal plane within a specimen are disclosed. The light-scanning systems can be incorporated in confocal microscopy instruments to create an excitation beam pivot axis that lies within an aperture at the back plate of an objective lens. The light-scanning systems receive a beam of excitation light from a light source and direct the excitation beam to pass through the pivot point in the aperture of the back plate of the objective lens while continuously scanning the focused excitation beam across a focal plane. The light-scanning systems are implemented with flat minors, which limits aberrations and attenuation of the excitation beam. The minors can be mounted in a compact arrangement to limit path length. Because the light-scanning systems are not implemented with lenses, only four degrees of freedom are used to align the excitation beam.

DETAILED DESCRIPTION

Figure 1A:
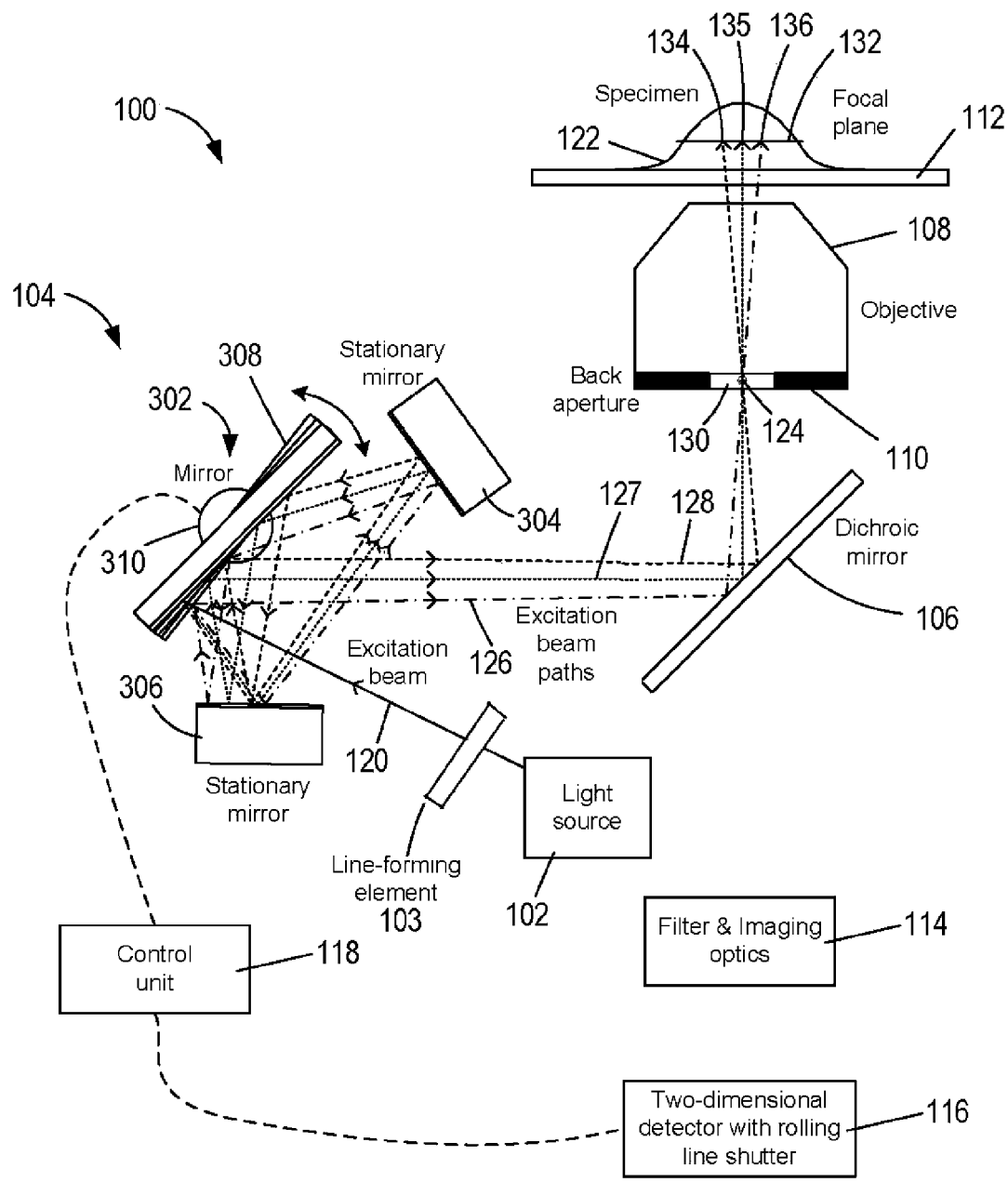
FIG. 1A shows a schematic representation of an example confocal microscopy instrument.

FIG. 1A shows a schematic representation of an example confocal microscopy instrument 100. There are many different types of confocal microscopy instruments and corresponding optical paths. Instrument 100 is not intended to represent the optical paths within all the different, well-known variations of confocal microscopy instruments, but is instead intended to illustrate the general principals of a confocal microscopy instrument that includes an integrated light-scanning system. The instrument 100 includes a light source 102, a line-forming element 103, a light-scanning system 104, a dichroic mirror 106, an objective lens 108 with a back plate 110, a stage 112, a filter and imaging optics 114, a detector 116 in rolling line shutter mode, and a control unit 118. The light source 102 can be a laser that emits a high-intensity, substantially monochromatic beam of excitation light 120 selected to stimulate emission of fluorescent light from fluorophores of fluorescent probes that are designed to bind to particular materials in a specimen 122. The light-scanning system 104 includes a scanning minor 302 and two stationary mirrors 304 and 306 that are described in greater detail below with reference to FIGS. 3-5. The excitation beam 120 passes through the line-forming element 103, which can be a powel lens that shapes the excitation beam 120 into a line-shaped excitation beam directed substantially perpendicular to the plane of the minors 304, 306 and 308.

The control unit 118 controls the position of mirror 308 so that the excitation beam 120, after six reflections off of the minors 304, 306 and 308, is ultimately output along one of many different paths that intersect at a point 124 called a "pivot point." For example, patterned lines 126-128 represent just three of a continuum of separate paths along which the light-scanning system 104 outputs the line-shaped excitation beam. The paths 126-128 intersect at the pivot point 124. The light source 102 and light-scanning system 104 are positioned within the instrument 100 so that the dichroic mirror 106 intersects the excitation beam paths so that the pivot point 124 is located at or near an aperture 130 of the back plate 110. For example, as shown in FIG. 1A, when the excitation beam is placed on any one of the paths 126-128 by the light-scanning system 104, the line-shaped excitation beam is reflected off of the dichroic minor 106 and passes through the pivot point 124 located within the aperture 130. The objective lens 108 focuses the excitation beam to a focal line that lies within a focal plane 132. For example, when the light-scanning system 104 places the excitation beam on any one of the three paths 126-128, the objective lens 108 focuses the line-shaped excitation beam onto focal lines 134-136, respectively, that lie within the focal plane 236 and are directed perpendicular to a plane containing the minors 304, 306, 308 and 106. The light-scanning system 104 is used to perform a line scan of the focal plane 236 by scanning the line-shaped excitation beam over a continuum of beam paths that pass through the pivot point 124.

Figure 1B:
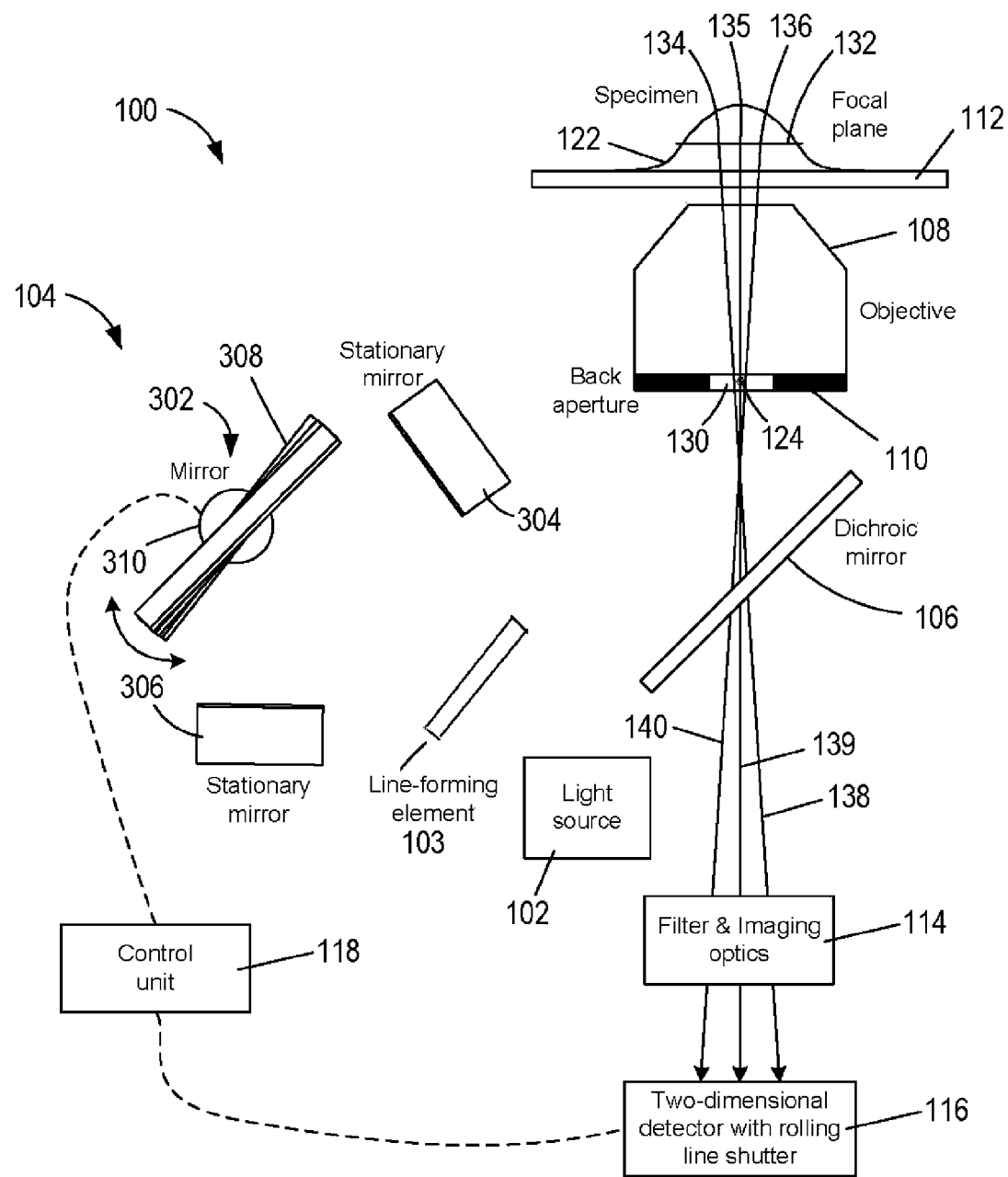
FIG. 1B shows the confocal microscopy instrument shown in FIG. 3 with three beams of fluorescent light emitted from a focal plane within a specimen.

For each focal line in the focal plane 132, a portion of the fluorescent light emitted from fluorophores in the specimen 122 surrounding the focal line is captured and collimated by the objective lens 108. For example, FIG. 1B shows the confocal microscopy instrument 100 with three fluorescent beams of light 138-140 emitted from the specimen 122 in the areas surrounding the focal points 134-136. The beams 138-140 are formed by the objective lens 108, pass through the dichroic mirror 106, and are filtered and focused onto a two-dimensional sensor of the detector 116 by the filter and imaging optics 114. The filter blocks the excitation light from reaching the detector 116 and imaging optics focus fluorescent light in the line-shaped beam on the sensor of the detector 116. The detector 116 can be a CMOS detector or a CCD detector with a two-dimensional arrangement of pixels that forms the two-dimensional sensor of the detector 116. The sensor of the detector 116 is operated in a rolling-line-shutter mode that is synchronized with the line scan of the focal plane 132 by the control unit 118. In the rolling-line-shutter mode, an image of the focal plane 132 is created by scanning the line-shaped excitation beam across the focal plane 132 while the corresponding focused and filtered line-shaped fluorescent beam is scanned across the two-dimensional sensor of the detector 116. Starting at one end of the sensor, rows of sensor pixels read the light in the line-shaped fluorescent beam as the beam is scanned across the sensor to the opposite end of the sensor. While the fluorescent beam is scanned across the sensor, rows of pixels ahead of the fluorescent beam are cleared or zeroed to prepare the pixels to read the fluorescent beam. When the fluorescent beam reaches the opposite end of the sensor the information read by the pixels is processed to form a two-dimensional image of the focal plane 132. The detection of light by rows of pixels outside of the row or rows of pixels synchronized to read the current position of the line-shaped fluorescent light are discarded in order to reject stray light from outside of the focal plane 132.

Figure 2:
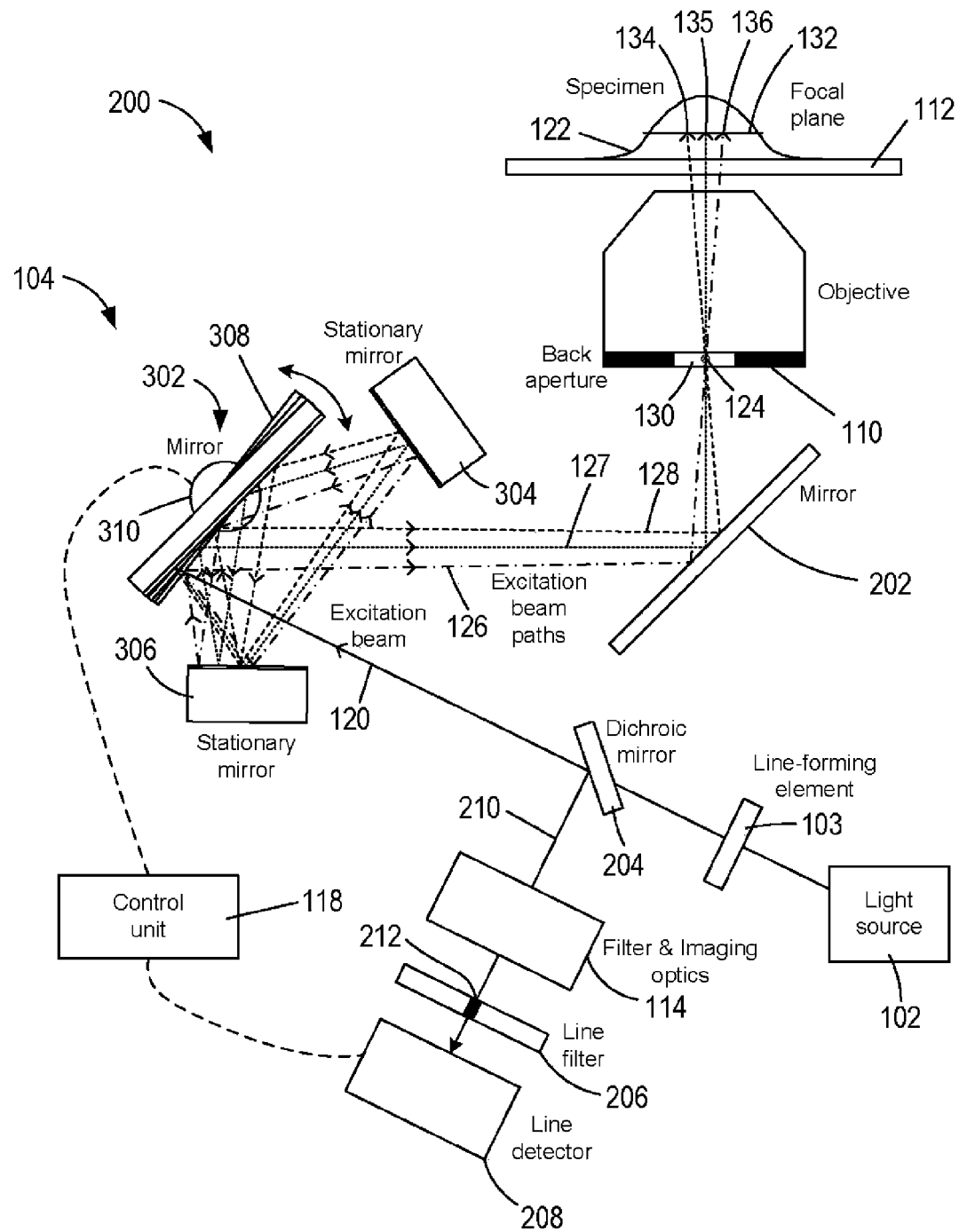
FIG. 2 shows a schematic representation of an example confocal microscopy instrument.

FIG. 2 shows a schematic representation of an example confocal microscopy instrument 200. The instrument 200 is similar to the instrument 100 except the dichroic mirror 106 of the instrument 100 has been replaced by a fully reflective minor 202 and includes a dichroic mirror 204 located in the path of the excitation beam 120 output from the line-forming element 103. The instrument 200 also includes a line filter 206 and a line detector 208. The dichroic minor 204 is configured to allow passage of the excitation beam 120 which is scanned across the focal plane 132 as described above with reference to FIG. 1A. Fluorescent light travels back along the same path as the excitation beam to the dichroic minor 204, which reflects the fluorescent light along a path 210 through the filter and imaging optics 114, a line slit 212 in the filter 206 and onto a line-shaped sensor of the line detector 208. For example, when the minor 308 is positioned to reflect the excitation beam 120 onto the path 126 to the focal line 136, fluorescent light emitted from fluorophores around the focal line 136 travels back along the same path 126 to the minor 308 and is reflected to the dichroic minor 204. The fluorescent light is filtered to remove stray excitation wavelengths and focused into a line-shaped beam that passes through the slit 212. The line filter 206 blocks stray light from sources located outside the focal line 136 so that essentially only the fluorescent light emitted from fluorophores located near or along the focal line 136 reaches the line-shaped sensor of the line detector 208. The line detector 208 can be CMOS camera or a CCD camera with a one- or two-dimensional sensor array of pixels that is aligned with the slit 212. Clearing and reading of the sensor area is synchronized with scanning of the focal plane 132 by the control unit 118. For example, when the minor 308 is rotated from a first position to a second position which moves the excitation beam from a first focal line to a second focal line of the focal plane 132, the sensor of the line detector 208 is cleared to read the fluorescent light emitted from the second focal line. When the excitation beam has swept across the focal plane 132, the information collected by the detector 208 is processed to form a two-dimensional image of the focal plane 132.

Figure 3A:
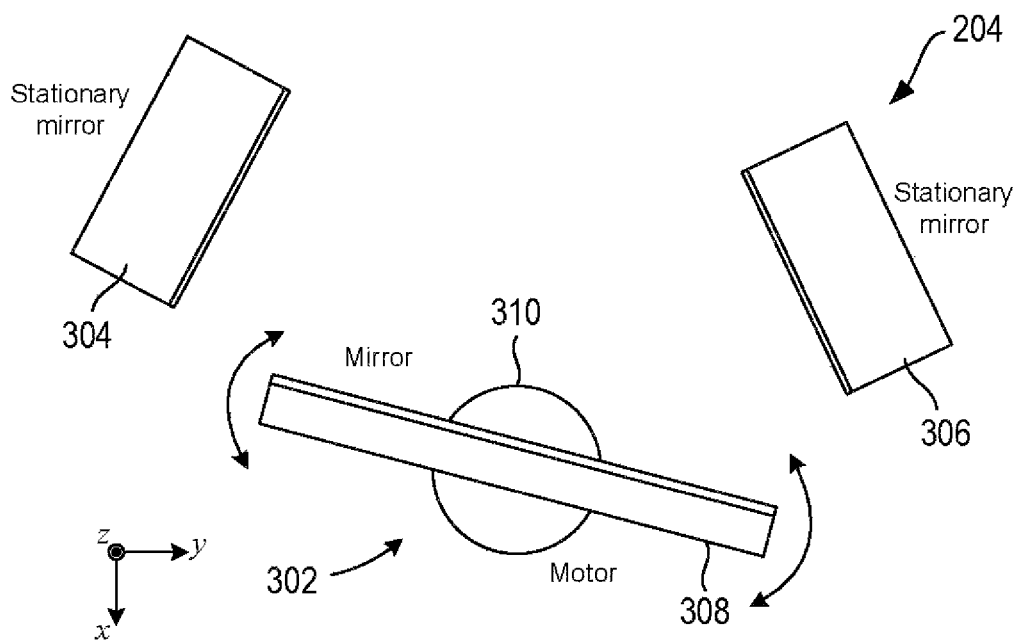
FIGS. 3A-3B show a top-plan view and an isometric view of an example light-scanning system.
Figure 3B:
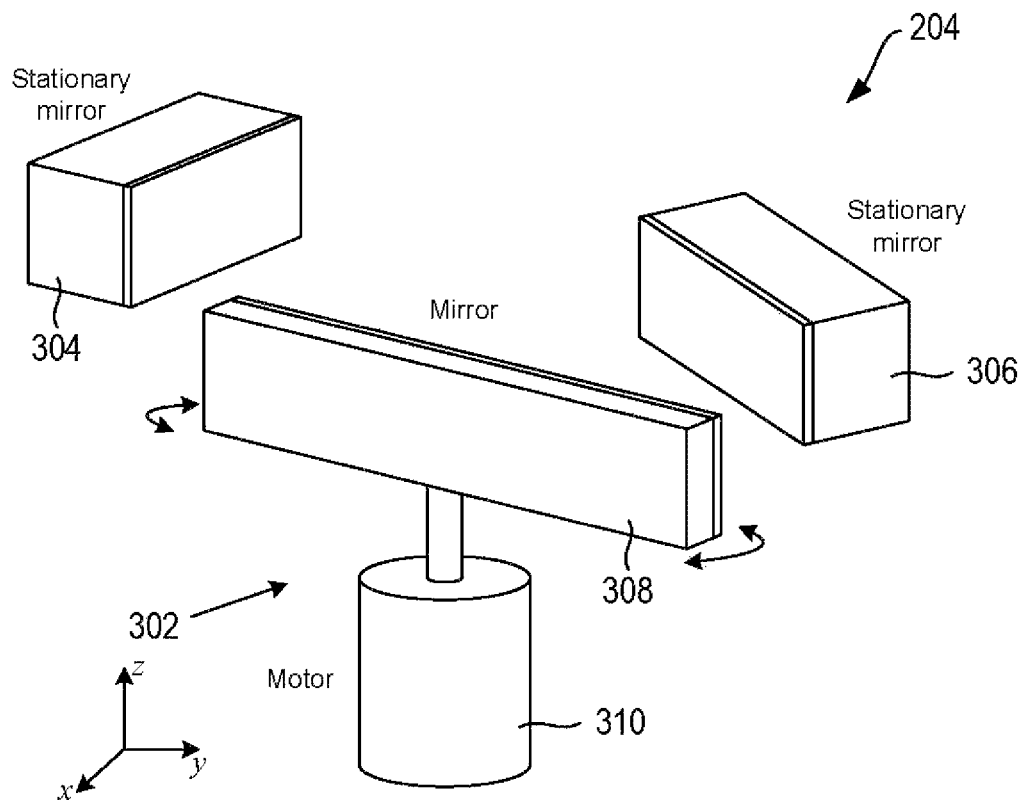

FIGS. 3A-3B show a top-plan view and an isometric view of an example light-scanning system 204. The system 204 includes the centrally located scanning minor 302, the first flat stationary mirror 304 with a reflective surface angled toward the scanning mirror 302 and the second flat stationary mirror 306 with a reflective surface angled toward the scanning minor 302, as shown above in FIG. 2. The first and second stationary mirrors 304 and 306 are also angled toward each other. In the example of FIGS. 3A-3B, the mirrors 304, 306 and 308 are oriented so that the reflective surfaces of the mirrors 304, 306 and 308 are substantially perpendicular to the same xy-plane. The scanning mirror 302 can be a galvanometer mirror that includes a flat pivot minor 308 attached to a rotatable shaft of a galvanometer motor 310. Alternatively, the scanning mirror can be a piezoelectric controlled mirror. As shown in FIGS. 3A-3B, the minor 308 is continuously rotated back and forth in the xy-plane through a range of angles by the motor 310.

Figure 4:
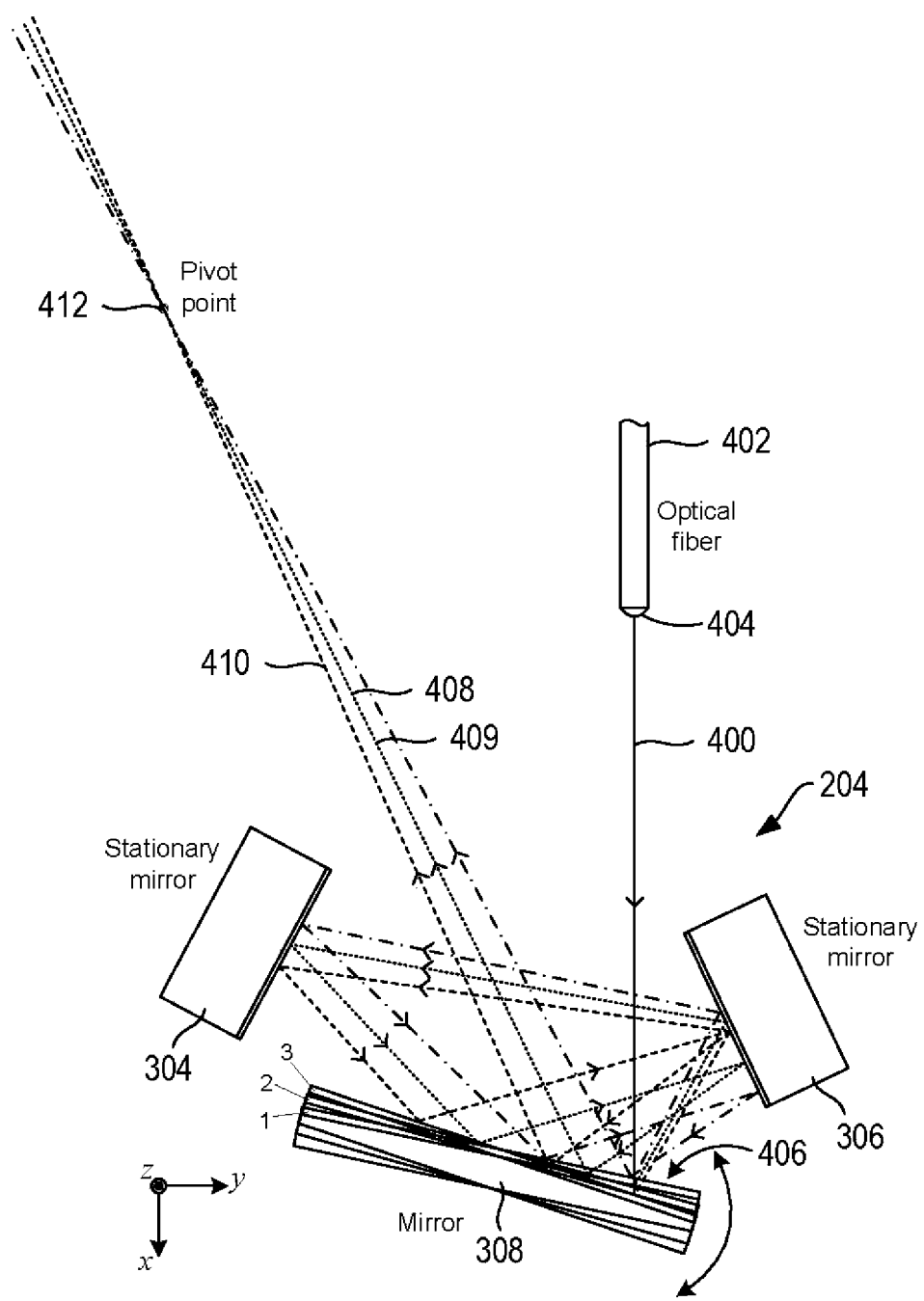
FIG. 4 shows the light-scanning system shown in FIG. 3 to output an excitation beam of light along different paths that pass through a pivot point.

FIG. 4 shows the light-scanning system 204 in operation with a beam of light 400 introduced to the system 204 via an optical fiber 402. For example, the beam of light can be an excitation beam output from a light source, such as the light source 202 described above, that is carried by the optical fiber 402 into the system 300. The optical fiber 402 may also include a lens 404 located at the butt end of the fiber 402 to focus the beam 400 onto a particular region 406 of the mirror 308. Alternatively, the beam 400 can be output directly from a laser, in which case the optical fiber 402 can be omitted. FIG. 4 shows the minor 308 rotated in three positions 1, 2 and 3, which represent just three of a continuum of rotational positions for the mirror 308. Differently patterned lines 408-410 represent the paths the beam travels through the system 300 when the pivot mirror 308 is rotated into one of the three positions 1, 2 and 3, respectively. As shown in the example of FIG. 4, the stationary mirrors 304 and 306 and the pivot mirror 308 place the beam 400 into a path that passes through a pivot point 412 via six reflections that lie within the same plane represented by the xy-plane. In practice, the mirror 308 can be rotated into any of one of a continuum of positions that result in the beam being output from the system 300 along a path that passes through the pivot point 412.

Figure 5A:
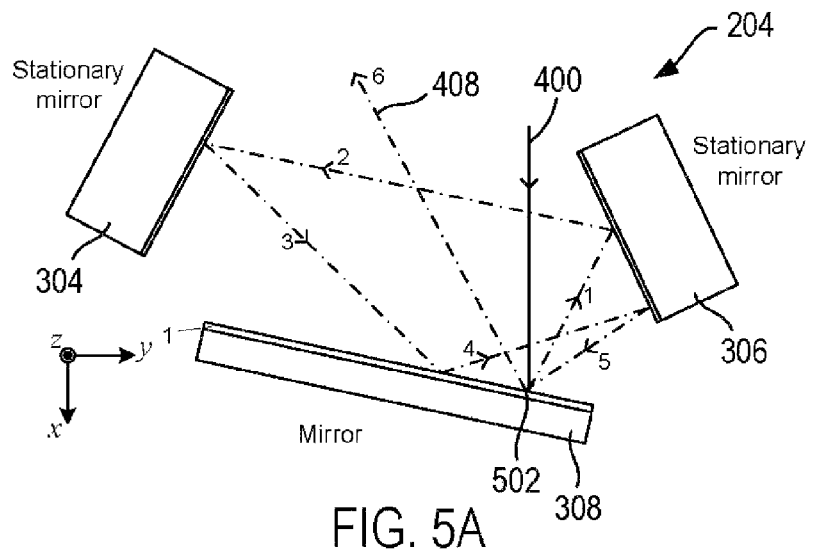
FIGS. 5A-5C show snapshots of three different paths an excitation beam travels through the light-scanning system shown in FIG. 3.
Figure 5B:
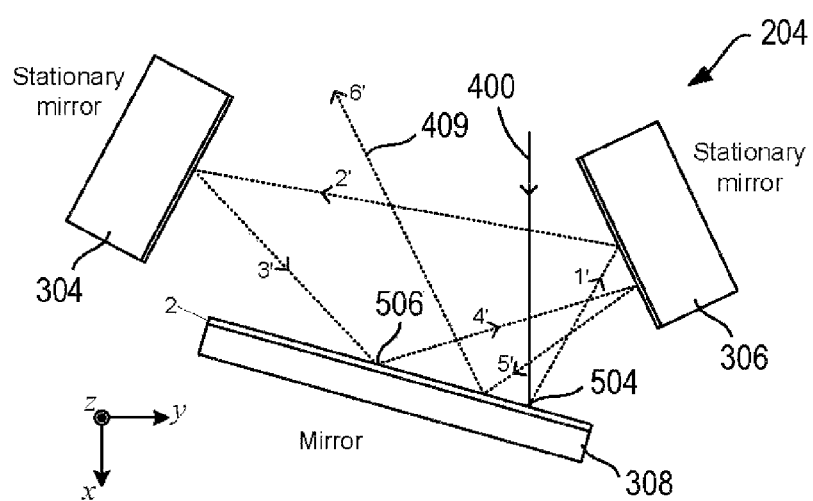
Figure 5C:
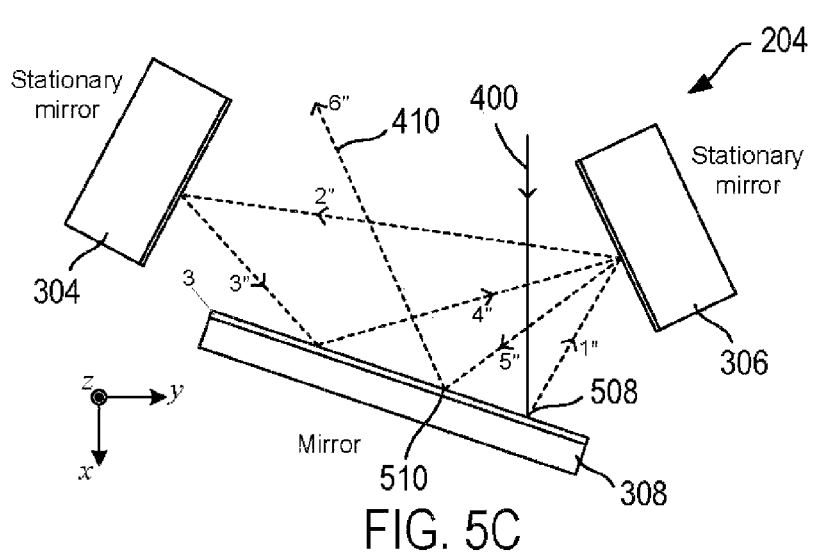

For each rotational position of the pivot mirror 308 that results in the beam 400 being placed on a path through the pivot point 412, the beam 400 is reflected off of pivot mirror 308 three times, the first stationary mirror 304 one time, and the second stationary mirror 306 two times for a total of six reflections. FIGS. 5A-5C show snapshots of internal paths the beam 400 travels through the system 300 when the pivot mirror 308 is rotated into the three positions 1, 2 and 3, respectively. In FIG. 5A, the pivot mirror 308 is rotated into position 1. The beam 400 strikes the pivot mirror 308 at the point 502 and undergoes six reflections off of the mirrors 304, 306 and 308 with the reflections numbered sequentially 1, 2, 3, 4, 5 and 6. The $6^{th}$ reflection off of the pivot mirror 308 near the point 502 places the beam on the path 408 shown in FIG. 4. In FIG. 5B, the pivot mirror 308 is rotated into position 2. The beam 400 strikes the pivot mirror 308 at the point 504 and undergoes six reflections off of the mirrors 304, 306 and 308 with the reflections numbered sequentially 1', 2', 3', 4', 5' and 6'. The $6'^{th}$ reflection off of the pivot mirror 308 at the point 506 places the beam on the path 409 shown in FIG. 4. In FIG. 5C, the pivot mirror 308 is rotated into position 3. The beam 400 strikes the pivot mirror 308 at the point 508 and undergoes six reflections off of the mirrors 304, 306 and 308 with the reflections numbered sequentially 1", 2", 3", 4", 5" and 6". The $6''^{th}$ reflection off of the pivot mirror 308 at the point 510 places the beam on the path 410 shown in FIG. 4.

The distance of the pivot point from the mirror 308 can be determined by how far the mirrors 304, 306 and 308 are spaced from each other. The farther the mirrors 304, 306 and 308 are spaced from one another, the farther pivot point is from the mirror 308. On the other hand, in order to position the pivot point closer to the mirror 308, distance between the mirrors 304, 306 and 308 is decreased.

The principle behind the ability to generate a downstream pivot point depends on the multiple reflections off of the pivot mirror. In a typical optical arrangement involving a pivot mirror, the beam reflects off of the pivot mirror only one time. In this arrangement, as the pivot mirror is scanned through a mechanical angle $\Delta\theta$, the output beam is scanned through an angle $2 \cdot \Delta\theta$, with the pivot axis of the output beam located approximately at the reflective face of the pivot mirror. If additional fixed mirrors are added to this arrangement so that the beam is redirected for a second reflection off of the pivot mirror, an additional scan angle of $2 \cdot \Delta\theta$ is either added or subtracted to the original scan angle. If there are an odd number of fixed mirror reflections between the first and second pivot mirror reflections, the $2 \cdot \Delta\theta$ scan angle from the second pivot mirror reflection is added for a total scan angle of $4 \cdot \Delta\theta$. If there are an even number of fixed mirror reflections between the first and second pivot mirror reflections, the $2 \cdot \Delta\theta$ scan angle from the second pivot mirror reflection is subtracted for a total scan angle of 0. In this second case, even though the total scan angle is zero, there is a non-zero lateral beam translation that is proportional to the total optical path length between the first and second pivot mirror reflections. When this lateral beam translation is applied to a third pivot mirror reflection, which is accomplished by once again redirecting the beam onto the pivot mirror via a reflection of one or more fixed mirrors, the net effect is a final scan angle equal to the original $2 \cdot \Delta\theta$, but with a translated beam pivot axis. If there are an even number of fixed mirror reflections in between the second and third pivot minor reflections, the pivot axis is translated upstream to a virtual pivot point, but if there are an odd number of fixed minor reflections in between the second and third pivot mirror reflections, the pivot axis is translated downstream to a real pivot point. Based upon these principles and with an additional pivot mirror and fixed mirror reflections, there are many ways to generate the same beam scanning with translated pivot axis. The systems described herein represent only one example of many ways in which multiple pivot mirror reflections can be utilized to generate a desired translation in the pivot axis of the scanned beam.

The foregoing description, for purposes of explanation, used specific nomenclature to provide a thorough understanding of the disclosure. However, it will be apparent to one skilled in the art that the specific details are not required in order to practice the systems and methods described herein. The foregoing descriptions of specific examples are presented for purposes of illustration and description. They are not intended to be exhaustive of or to limit this disclosure to the precise forms described. Obviously, many modifications and variations are possible in view of the above teachings. The examples are shown and described in order to best explain the principles of this disclosure and practical applications, to thereby enable others skilled in the art to best utilize this disclosure and various examples with various modifications as are suited to the particular use contemplated. It is intended that the scope of this disclosure be defined by the following claims and their equivalents.

The invention claimed is:

1. A light-scanning system comprising:
a scanning mirror;
at least two stationary mirrors with reflective surfaces angled toward the scanning mirror;
an objective lens that includes a back plate with an aperture; and
a redirection mirror,
wherein the scanning mirror is positioned so that when a beam of light strikes the scanning mirror, the beam is to undergo at least seven reflections with a final reflection off of the redirection mirror that places the beam on a path through a pivot point in the aperture, and
wherein two of the at least two stationary mirrors, the scanning mirror, and the redirection mirror are arranged so that a wave packet of the beam is to undergo a first reflection off of the scanning mirror, a second reflection off of a first stationary mirror, a third reflection off of a second stationary mirror, a fourth reflection off of the scanning mirror, a fifth reflection off of the first stationary mirror, a sixth reflection off of the scanning mirror, and a seventh reflection off of the redirection mirror that places the beam on a path through the pivot point in the aperture, in that order while the scanning mirror is in any single rotational angle within a range of angles utilized for scanning.

2. The system of claim 1, wherein the scanning mirror is a flat mirror to be rotated back and forth over a range of angles.

3. The system of claim 1, wherein the scanning mirror further comprises a galvanometer mirror.

4. The system of claim 1, wherein the scanning mirror further comprises a piezoelectric controlled mirror.

5. The system of claim 1, wherein the at least two stationary mirrors comprise a first stationary mirror with a reflective surface angled toward the scanning mirror, and a second stationary mirror with a reflective surface angled toward the scanning mirror and the first stationary mirror.

6. The system of claim 1, wherein the at least six reflections are within the same plane.

7. The system of claim 1, wherein the at least two stationary mirrors and the scanning mirror lie within the same plane.

* * * * *